(12) United States Patent
Bai

(10) Patent No.: US 10,846,867 B2
(45) Date of Patent: Nov. 24, 2020

(54) APPARATUS, METHOD AND IMAGE PROCESSING DEVICE FOR SMOKE DETECTION IN IMAGE

(71) Applicant: FUJITSU LIMITED, Kawasaki (JP)

(72) Inventor: Xianghui Bai, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 211 days.

(21) Appl. No.: 15/978,817

(22) Filed: May 14, 2018

(65) Prior Publication Data
US 2018/0260963 A1   Sep. 13, 2018

Related U.S. Application Data

(63) Continuation of application No. PCT/CN2015/095178, filed on Nov. 20, 2015.

(51) Int. Cl.
*G06T 7/00* (2017.01)
*G06K 9/00* (2006.01)
(Continued)

(52) U.S. Cl.
CPC .......... *G06T 7/251* (2017.01); *G06K 9/00771* (2013.01); *G06K 9/4652* (2013.01); *G06K 9/525* (2013.01); *G06T 7/00* (2013.01); *G06T 7/194* (2017.01); *G06T 7/90* (2017.01); *G08B 17/10* (2013.01); *G08B 17/125* (2013.01)

(58) Field of Classification Search
None
See application file for complete search history.

(56) References Cited

U.S. PATENT DOCUMENTS

2008/0186191 A1* 8/2008 Shen-Kuen .......... G08B 17/125
340/628
2009/0226092 A1   9/2009 Kuroda et al.
(Continued)

FOREIGN PATENT DOCUMENTS

CN  101233541 A   7/2008
CN  101441771 A   5/2009
(Continued)

OTHER PUBLICATIONS

Barmpoutis, P.—"Smoke detection using spatio-temporal analysis, motion modeling and dynamic texture recognition"—Nov. 13, 2014—IEEE, pp. 1078-1082 (Year: 2014).*
(Continued)

*Primary Examiner* — Bernard Krasnic
(74) *Attorney, Agent, or Firm* — Staas & Halsey LLP

(57) ABSTRACT

Smoke detection based on video images includes performing background image modeling on a current image, to acquire a foreground image and a background image of the current image; acquiring one or more candidate areas in the current image used for detecting a moving object, based on the foreground image; calculating attribute information of a candidate area corresponding to the current image and/or the background image; and determining whether there exists smoke in the candidate area according to the attribute information. The smoke can be detected quickly and accurately through video images, but also the detection accuracy of video-based smoke detection when light changes and at complex environments can be provided.

15 Claims, 19 Drawing Sheets

(51) Int. Cl.

| | | |
|---|---|---|
| *G08B 17/12* | (2006.01) | |
| *G06T 7/246* | (2017.01) | |
| *G06K 9/52* | (2006.01) | |
| *G08B 17/10* | (2006.01) | |
| *G06K 9/46* | (2006.01) | |
| *G06T 7/194* | (2017.01) | |
| *G06T 7/90* | (2017.01) | |

(56) References Cited

U.S. PATENT DOCUMENTS

| | | | |
|---|---|---|---|
| 2009/0315722 A1* | 12/2009 | Hou | G08B 17/125 340/578 |
| 2013/0121546 A1* | 5/2013 | Guissin | G06T 7/0012 382/128 |
| 2016/0260306 A1* | 9/2016 | Jackel | G06K 9/6277 |

FOREIGN PATENT DOCUMENTS

| | | |
|---|---|---|
| CN | 101609589 A | 12/2009 |
| CN | 101738394 A | 6/2010 |
| CN | 101751558 A | 6/2010 |
| CN | 101908141 A | 12/2010 |
| CN | 101916372 A | 12/2010 |
| CN | 102136059 A | 7/2011 |
| CN | 102663869 A | 9/2012 |
| CN | 103983574 A | 8/2014 |
| CN | 104050480 A | 9/2014 |
| CN | 104316974 A | 1/2015 |
| CN | 104408745 A | 3/2015 |
| CN | 104978733 A | 10/2015 |
| EP | 2000952 A2 | 12/2008 |
| EP | 2000952 A3 | 6/2010 |
| JP | 4926603 B2 | 2/2012 |
| JP | 2014-191376 | 10/2014 |
| KR | 10-2008-0077481 | 8/2008 |

OTHER PUBLICATIONS

Notification of Reasons for Refusal Office Action dated Aug. 6, 2019 in related in Japanese Patent Application No. 2018-525692 (8 pages) (8 pages English Translation).

First Office Action dated May 5, 2019 in related Chinese Patent Application No. 201580084015.3 (7 pages) (11 pages English Translation).

Search Report dated May 5, 2019 in related Chinese Patent Application No. 201580084015.3 (4 pages) (3 pages English Translation).

Partial Supplementary European Search Report dated Jun. 3, 2019 in related European Patent Application No. 15908590.1 (17 pages).

Chen-Yu Lee et al: "Spatio-temporal analysis in smoke detection"; Signal and Image Processing Applications (ICSIPA), 2009 IEEE International Conference On, Nov. 18, 2009 (Nov. 18, 2009), pp. 80-83, XP031685430, IEEE, Piscataway, NJ, USA ISBN: 978-1-4244-5560-7 (4 pages).

Yong-Ren Pu et al: "Study of smoke detection by analysis of saturation in video"; Fluid Power and Mechatronics (FPM), 2011 International Conference On, Aug. 17, 2011 (Aug. 17, 2011), pp. 169-172, XP032459113, IEEE, Piscataway, NJ USA DOI: 10.1109/FPM.2011.6045751 ISBN: 978-1-4244-8451-5 (4 pages).

Written Opinions of the International Searching Authority (Forms PCT/ISA/237, PCT/ISA/220, PCT/ISA210); dated Jul. 1, 2016 in corresponding PCT Application No. PCT/CN2015/095178 (13 pages) (3 pages English Translation).

Extended European Search Report dated Sep. 26, 2019 in related European Patent Application No. 15908590.1 (14 pages).

Chinese Office Action and Search Report dated Nov. 18, 2019 in corresponding Chinese Patent Application 201580084015.3 Office Action: (8 pages) (12 pages English Translation); Search Report: (3 pages) (2 pages English Translation).

Decision of Rejection dated Apr. 24, 2020 in related Chinese Patent Application No. 201580084015.3 (6 pages) (10 pages English Translation).

* cited by examiner

APPARATUS, METHOD AND IMAGE PROCESSING DEVICE FOR SMOKE DETECTION IN IMAGE

CROSS-REFERENCE TO RELATED APPLICATION(S)

This application is a continuation application of PCT International Patent Application No. PCT/CN2015/095178, filed on Nov. 20, 2015, in the State Intellectual Property Office of China, the content of which is incorporated by reference herein.

BACKGROUND

1. Field

This disclosure relates to the field of graphic and image technologies, and in particular to an apparatus, method and an image processing device for smoke detection.

2. Description of the Related Art

Currently, smoke detection is required in video surveillance. For example, when a fire occurs at a certain place in a building, if appearance of smoke in the area may be automatically detected via video images, fire alarm can be performed as soon as possible to reduce the loss caused by the fire.

However, due to the diffuse nature of smoke motion, accurate detection of smoke based on video images is difficult. In the prior art, the technical solutions for determining the presence or absence of smoke through detection on the video image have the problems that the detection accuracy is not high and the detection cannot be performed quickly and accurately.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

Embodiments of this disclosure provide an apparatus, method and an image processing device for smoke detection, in which the smoke can be detected quickly and accurately through video images, and the detection accuracy of video-based smoke detection when light changes and at complex environments can be improved.

According to a first aspect of the embodiments of this disclosure, there is provided an apparatus for smoke detection, including: a background image modeling unit configured to perform background image modeling on a current image, to acquire a foreground image and a background image of the current image; a candidate area acquiring unit configured to acquire one or more candidate areas in the current image used for detecting a moving object, based on the foreground image; an attribute information calculating unit configured to calculate attribute information of a candidate area corresponding to the current image and/or the background image; and a smoke determining unit configured to determine whether there exists smoke in the candidate area according to the attribute information.

According to a second aspect of the embodiments of this disclosure, there is provided a method for smoke detection, including: performing background image modeling on a current image, to acquire a foreground image and a background image of the current image; acquiring one or more candidate areas in the current image used for detecting a moving object, based on the foreground image; calculating attribute information of a candidate area corresponding to the current image and/or the background image; and determining whether there exists smoke in the candidate area according to the attribute information.

According to a third aspect of the embodiments of this disclosure, there is provided an image processing device, including the apparatus for smoke detection as described above.

According to another aspect of the embodiments of this disclosure, there is provided a computer readable program code, which, when executed in an image processing device, will cause a computer unit to carry out the method for smoke detection as described above in the image processing device.

According to a further aspect of the embodiments of this disclosure, there is provided a computer readable medium, including a computer readable program code, which will cause a computer unit to carry out the method for smoke detection as described above in an image processing device.

An advantage of the embodiments of this disclosure exists in that one or more candidate areas are acquired based on the foreground image, attribute information of a candidate area corresponding to the current image and/or the background image is calculated, and whether there exists smoke in the candidate area is determined according to the attribute information. Hence, not only the smoke can be detected quickly and accurately through video images, but also the detection accuracy of video-based smoke detection when light changes and at complex environments can be improved.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of this disclosure. To facilitate illustrating and describing some parts of the invention, corresponding portions of the drawings may be exaggerated or reduced.

Elements and features depicted in one drawing or embodiment of the invention may be combined with elements and features depicted in one or more additional drawings or embodiments. Moreover, in the drawings, like reference

DETAILED DESCRIPTION OF THE EMBODIMENTS

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims.

Embodiment 1

Figure 1:
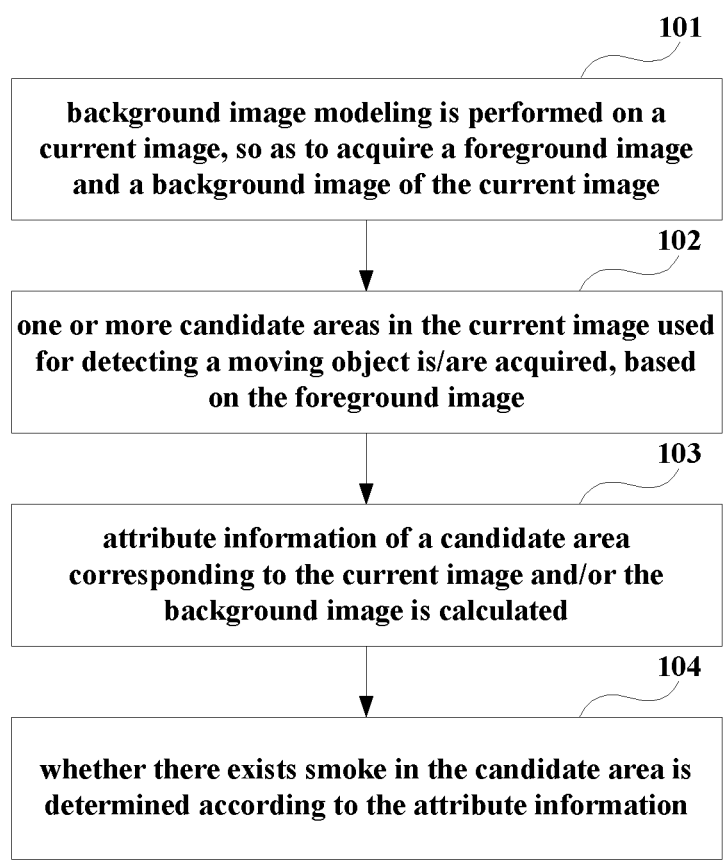
FIG. 1 is a schematic diagram of the method for smoke detection of Embodiment 1 of this disclosure.

The embodiment of this disclosure provides a method for smoke detection. FIG. 1 is a schematic diagram of the method for smoke detection of Embodiment 1 of this disclosure. As shown in FIG. 1, the method for smoke detection includes:

Block 101: background image modeling is performed on a current image, so as to acquire a foreground image and a background image of the current image.

Block 102: one or more candidate areas in the current image used for detecting a moving object is/are acquired, based on the foreground image.

Block 103: attribute information of a candidate area corresponding to the current image and/or the background image is calculated; and Block 104: whether there exists smoke in the candidate area is determined according to the attribute information.

In this embodiment, a video including a plurality of frames may be obtained by using such a device as a camera. A background image modeling method based on a Gaussian mixture model (GMM) may be used, to acquire the foreground image and the background image after performing background modeling on the color current image (or called current frame) of the input video. However, this disclosure is not limited thereto, and any method of background image modeling may be adopted.

In this embodiment, one or more candidate areas may be acquired, based on the foreground image. For example, the foreground image may be expressed by a binary image and a binarized image of the foreground image may be obtained; for example, a pixel value of a foreground portion pixel is "1", and a pixel value of a background portion pixel is "0".

In this embodiment, the binarized image may be median-filtered to remove small noise points. Then, a plurality of pixels having the same pixel value (for example, "1") and connecting with each other in the binarized image are used as a connected component (CC), to acquire one or more connected components representing the moving object in the foreground image. For example, a number of connected components of different sizes may be extracted from a binarized image.

Figure 2:
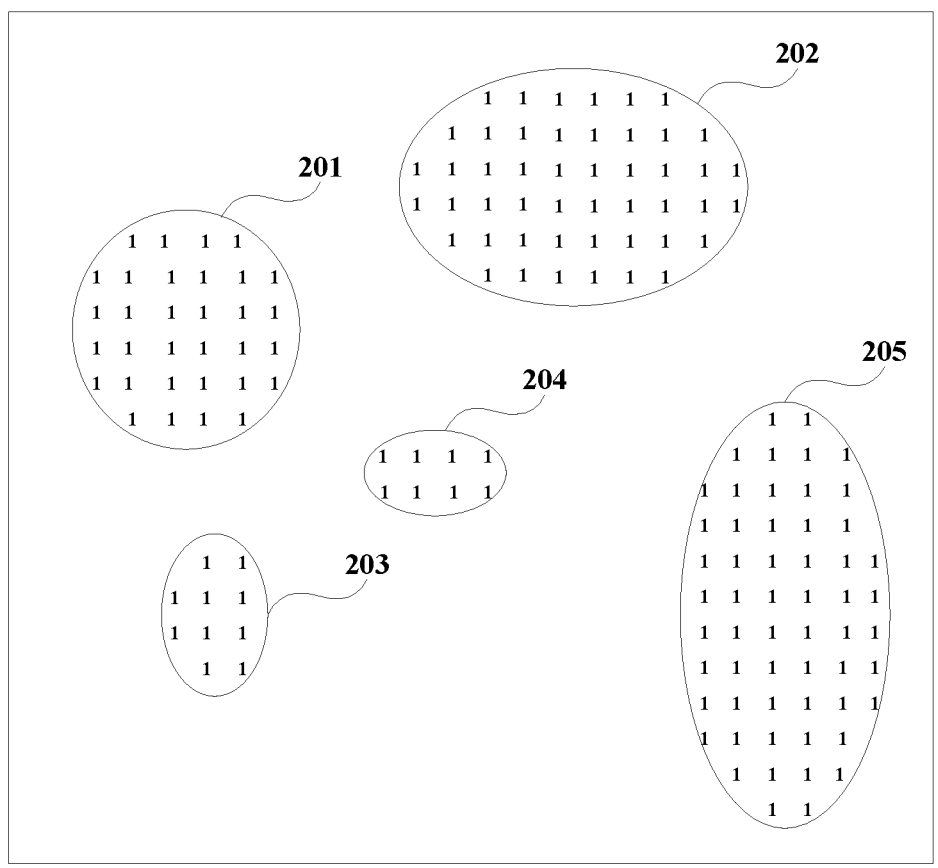
FIG. 2 is a schematic diagram of extracting a connected component of Embodiment 1 of this disclosure.

FIG. 2 is a schematic diagram of extracting a connected component of Embodiment 1 of this disclosure. As shown in FIG. 2, for example, a plurality of connected pixels of which the pixel values are "1" may form a connected component. In this binarized image, a total of five connected components may be extracted, which are respectively marked as a connected component 201, a connected component 202, . . . , and a connected component 205.

In this embodiment, one or more connected components may be selected to acquire one or more candidate areas. For example, a connected component of an area less than or equal to a predefined threshold (a first threshold) may be removed, and/or a connected component of an average color depth out of a predefined range may be removed. A particular value of the first threshold may be, for example, set in advance based on an empirical value, and the first threshold is not limited in this disclosure.

In the example shown in FIG. 2, for example, if the areas of the connected components 203 and 204 are both smaller than the first threshold, and the areas of the connected components 201, 202, and 205 are all greater than the first threshold, the connected components 201, 202, and 205 may be taken as candidate areas.

In this embodiment, for each candidate area, whether smoke is present in the candidate area may be determined. For example, for a candidate area, attribute information of the candidate area corresponding to the current image and/or background image may be calculated, and whether or not smoke is present in the candidate area may be determined according to the attribute information.

The attribute information may include one or more of the following types of information: saturation information, gray variance information, gradient direction information, gray average information, and moving direction information. However, this disclosure is not limited thereto, and other attribute information corresponding to the current image and/or background image may also be used. This disclosure is described by taking the above attribute information as an example only.

Hence, not only the smoke can be detected quickly and accurately through video images, but also the detection accuracy of video-based smoke detection when light changes and at complex environments can be improved.

Figure 3:
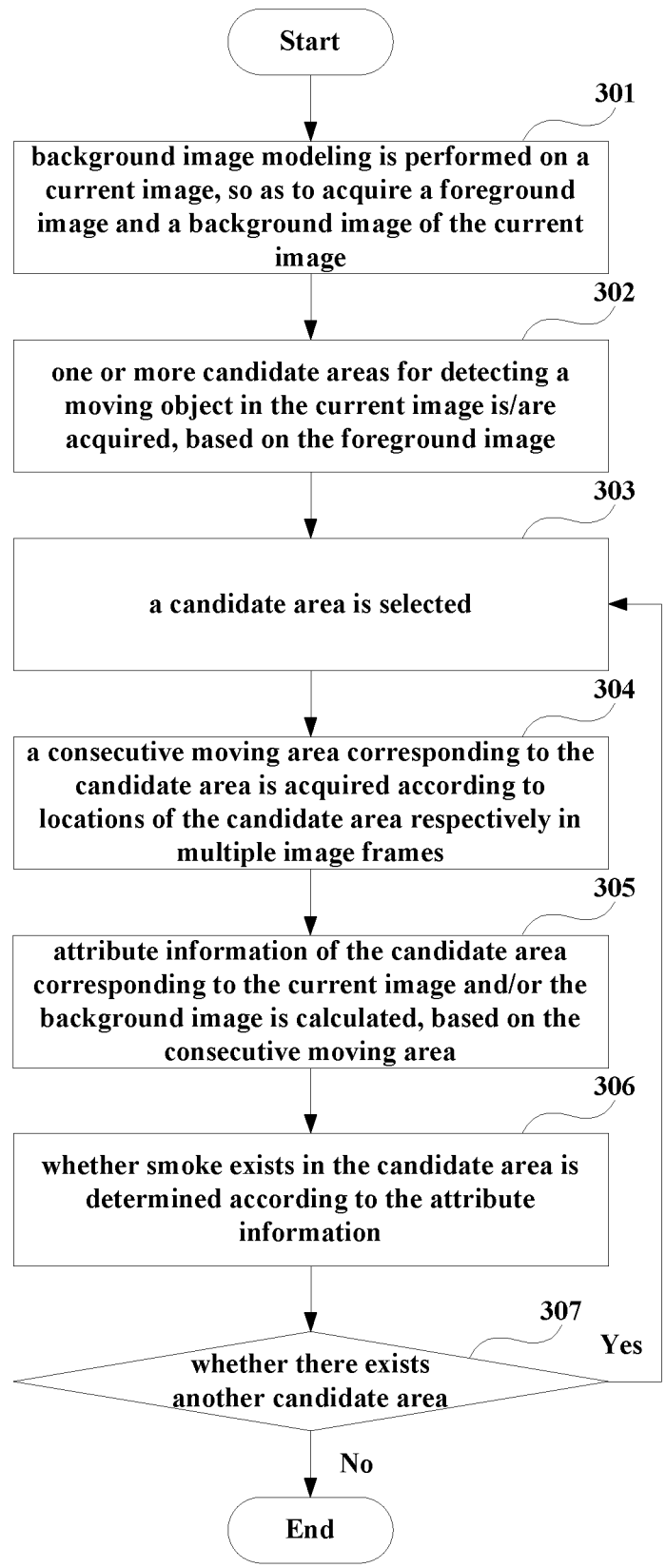
FIG. 3 is another schematic diagram of the method for smoke detection of Embodiment 1 of this disclosure.

FIG. 3 is another schematic diagram of the method for smoke detection of the embodiment of this disclosure, which further uses the consecutive moving area based on a candidate area for smoke detection. As shown in FIG. 3, the method for smoke detection includes:

Block 301: background image modeling is performed on a current image, so as to acquire a foreground image and a background image of the current image.

Block 302: one or more candidate areas for detecting a moving object in the current image is/are acquired, based on the foreground image.

Block 303: a candidate area is selected.

Block 304: a consecutive moving area corresponding to the candidate area is acquired, according to locations of the candidate area respectively in multiple image frames; in this embodiment, multiple consecutive (e.g. N) image frames before the current frame may be acquired, and then corresponding candidate areas in the N+1 frames (the N image frames and the current frame) are combined to construct a consecutive moving area to which the candidate area corresponds, that is, the consecutive moving area is a "moving trajectory" of the candidate area in the N+1 image frames.

Figure 4:
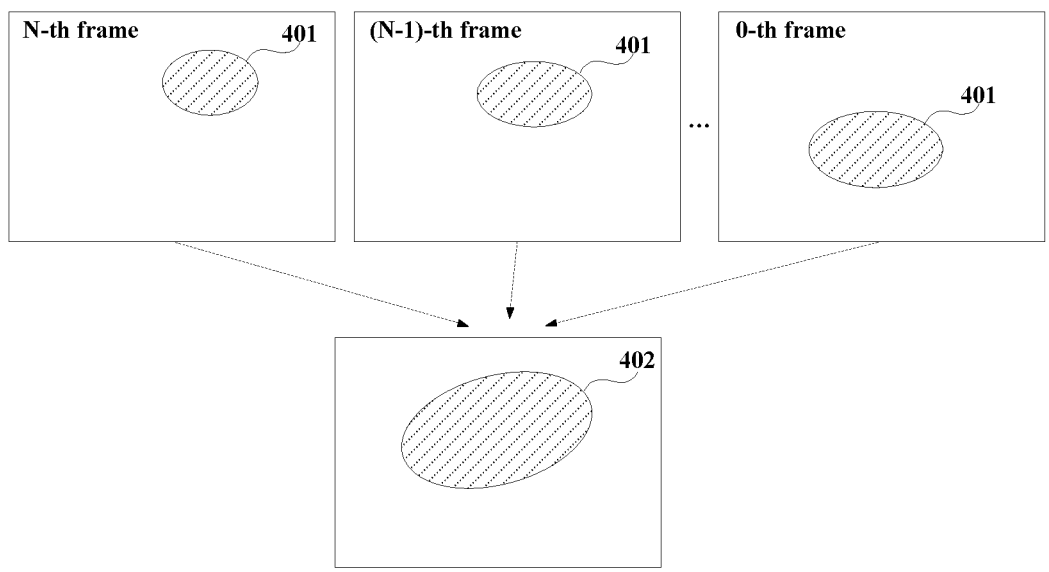
FIG. 4 is a schematic diagram of acquiring a consecutive moving area of Embodiment 1 of this disclosure.

FIG. 4 is a schematic diagram of acquiring the consecutive moving area of the embodiment of this disclosure. As shown in FIG. 4, the current frame is denoted as an N-th frame, and there are N image frames before the N-th frame (from the 0-th frame to the (N−1)-th frame). There exist candidate area 401 in all the N+1 image frames from the N-th frame to the 0-th frame. Positions and shapes of the candidate area 401 may possibly vary in the 0-th to the N-th frame. By combining the candidate areas 401, a consecutive moving area 402 may be obtained.

Block 305: attribute information of the candidate area corresponding to the current image and/or the background image is calculated, based on the consecutive moving area.

Block 306: whether smoke exists in the candidate area is determined according to the attribute information; and Block 307: whether there exists another candidate area is determined, if it is determined yes, executing block 303 to select another candidate area and continue to perform determination on another candidate area.

The flow of the method for smoke detection of the embodiment of this disclosure is schematically described above. In the following, smoke detection on a candidate area in this disclosure shall be further explained by taking moving direction information, a saturation average value, a gray variance value, an average value of the gradient direction information, and a gray average value as examples. For how to obtain a candidate area and how to obtain a consecutive moving area, reference may be made to the above contents.

In one implementation (Implementation 1), whether there exists smoke in a candidate area may be determined, according to whether a major moving direction of the candidate area in multiple image frames is downward.

Figure 5:
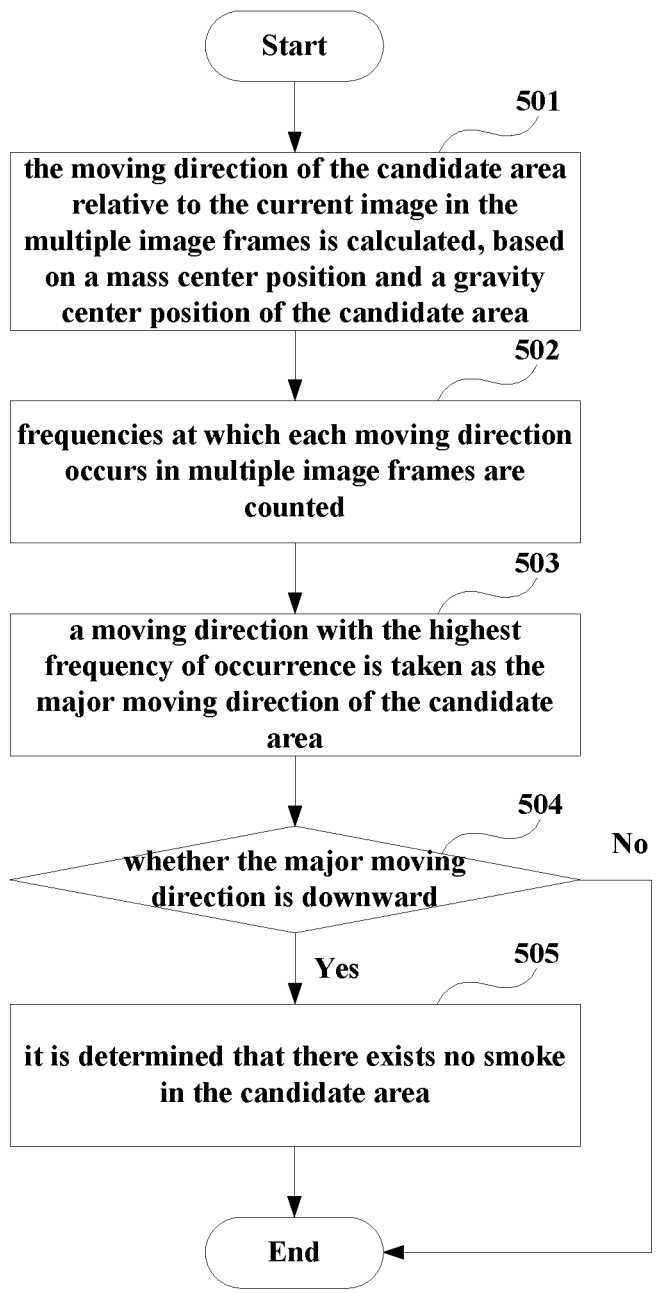
FIG. 5 is a schematic diagram of performing smoke detection on a candidate area of Embodiment 1 of this disclosure.

FIG. 5 is a schematic diagram of performing smoke detection on a candidate area of the embodiment of this disclosure. As shown in FIG. 5, the method includes:

Block 501: the moving direction of the candidate area relative to the current image in the multiple image frames is calculated, based on a mass center position and a gravity center position of the candidate area.

For example, the mass center Mc (Xc, Yc) of "the candidate area" in the current frame may be calculated by using the following equation (1).

$$X_c = \frac{\sum_{p \in Component} p.x}{N}; Y_c = \frac{\sum_{p \in Component} p.y}{N}; \qquad (1)$$

where, N is the number of pixels included in "the candidate area", p∈component indicates that the "candidate area" includes a pixel p, p.x refers to the x coordinate of the pixel p, and p.y refers to the y-coordinate of the pixel p.

Assuming that the mass center of "the candidate area" of the current frame is Mc (Xc, Yc), and a gravity center of a corresponding "candidate area" in a number of frames before the current frame (for example, the 5th or 10th frame before the current frame) is Mp (Xp, Yp), then the following values are calculated:

$$\Delta X = X_c - X_p,$$

$$\Delta Y = Y_c - Y_p.$$

Figure 6:
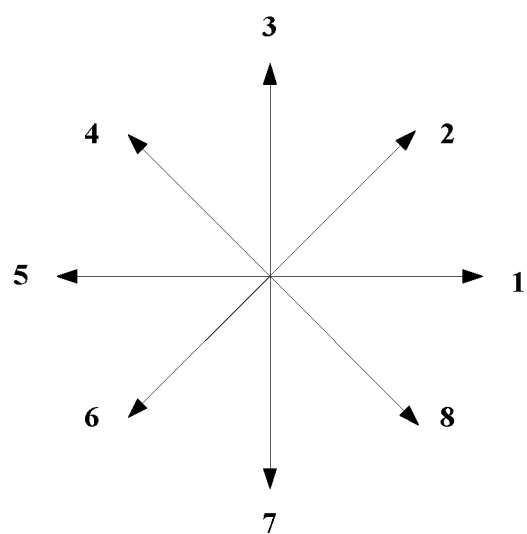
FIG. 6 is a schematic diagram of a direction of Embodiment 1 of this disclosure.

FIG. 6 is a schematic diagram of a direction of the embodiment of this disclosure. As shown in FIG. 6, 8 directions may be defined; however, this disclosure is not limited thereto. For example, more or less directions may be defined, definition may be performed according to an actual situation.

If $\Delta X > 0$ and $\Delta Y = 0$, the moving direction is 1;
if $\Delta X > 0$ and $\Delta Y < 0$, the moving direction is 2;
if $\Delta X = 0$ and $\Delta Y < 0$, the moving direction is 3;
if $\Delta X < 0$ and $\Delta Y < 0$, the moving direction is 4;
if $\Delta X < 0$ and $\Delta Y = 0$, the moving direction is 5;
if $\Delta X < 0$ and $\Delta Y > 0$, the moving direction is 6;
if $\Delta X = 0$ and $\Delta Y > 0$, the moving direction is 7; and
if $\Delta X > 0$ and $\Delta Y > 0$, the moving direction is 8.

In this way, the moving directions of the candidate area relative to the current frame in each image frame may be obtained.

Block 502: frequencies at which each moving direction occurs in multiple image frames are counted.

Block 503: a moving direction with the highest frequency of occurrence is taken as the major moving direction of the candidate area.

In this embodiment, the moving directions of "the candidate area" in a number of consecutive frames may be recorded, and the frequencies of occurrence of each moving direction may also be recorded. And then the moving direction with the highest frequency of occurrence is deemed as the major moving direction of "the candidate area".

Block 504: it is determined whether the major moving direction is downward, and block 505 is executed when the major moving direction is downward; and Block 505: it is determined that there exists no smoke in the candidate area.

In this implementation, for example, if the major moving direction of "a candidate area" is downward (such as 6, 7, 8, shown in FIG. 6), "the candidate area" of the current frame may be removed from "a candidate area list"; that is, determining that there exists no smoke in the candidate area. Furthermore, in a case where the major moving direction is not downward, it may be determined that there exists smoke in the candidate area, or in order to make the detection result more accurate, detection of other items on the candidate area may be continued.

In another implementation (Implementation 2), whether there exists smoke in a candidate area may be determined according to whether saturation information of the candidate area is less than a predefined threshold.

Figure 7:
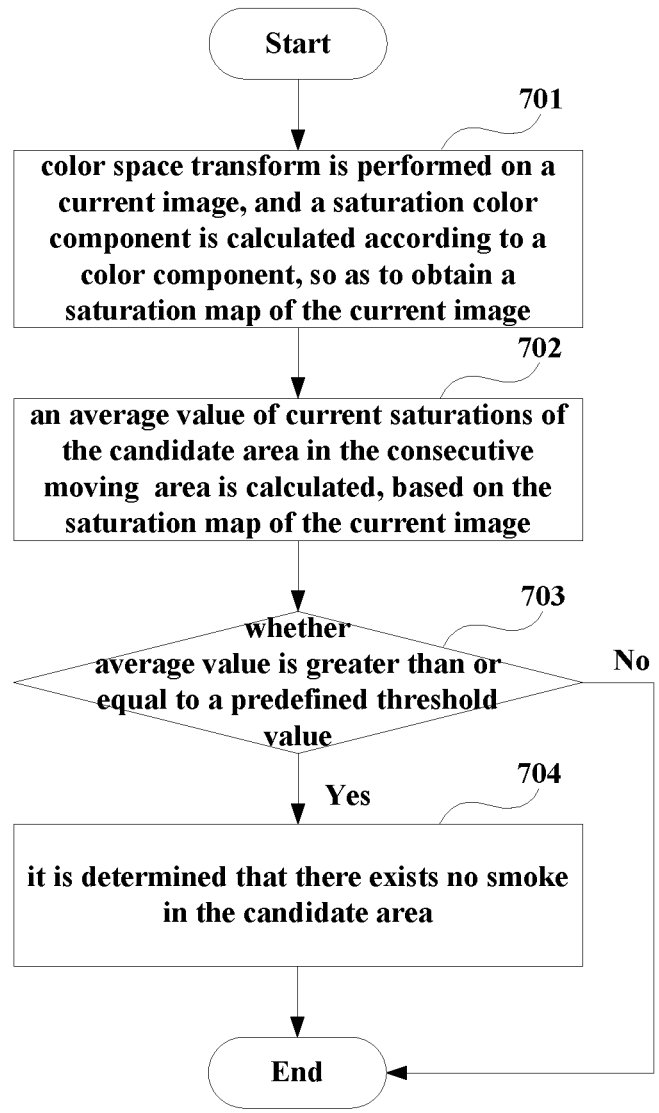
FIG. 7 is another schematic diagram of performing smoke detection on a candidate area of Embodiment 1 of this disclosure.

FIG. 7 is another schematic diagram of performing smoke detection on a candidate area of the embodiment of this disclosure. As shown in FIG. 7, the method includes:

Block 701: color space transform is performed on a current image, and a saturation color component is calculated according to a color component, so as to obtain a saturation map of the current image.

For example, an equation for calculating a saturation is as shown by equation (2) below:

$$s = \begin{cases} 0, & \text{if } \max(r, g, b) = 0 \\ \dfrac{\max(r, g, b) - \min(r, g, b)}{\max(r, g, b)}, & \text{otherwise} \end{cases} \quad (2)$$

How to calculate a saturation of a pixel is only illustrated above. Any existing methods may be used for calculating a saturation, which shall not be described herein any further.

Block 702: an average value of current saturations of the candidate area in the consecutive moving area is calculated, based on the saturation map of the current image.

For example, an equation for calculating the average value of current saturations may be as shown by equation (3) below:

$$S_{avg} = \dfrac{\sum_{i \in \Omega} S_i}{N}; \quad (3)$$

where, $S_{avg}$ is the average value of current saturations, $\Omega$ is the consecutive moving area, N is the number of pixels of the consecutive moving area, i is a pixel of the consecutive moving area, and $S_i$ is a saturation value of the pixel i.

The above equation only illustrates how to calculate the average value of current saturations. However, this disclosure is not limited thereto, and appropriate adjustment or variation may be made according to an actual situation.

Block 703: it is determined whether the average value of the current saturations is greater than or equal to a predefined threshold value (a second threshold value), and block 704 is executed when the average value of the current saturations is greater than or equal to the predefined threshold value; in this embodiment, a particular numeral value of the second threshold value may be, for example, predefined according to an empirical value, and is not limited in this disclosure.

Block 704: it is determined that there exists no smoke in the candidate area.

In this implementation, for example, if the average value of the current saturations is greater than or equal to the second threshold value, it shows that the saturation of the moving object is relatively high, and a saturation of smoke is generally relatively low, therefore it may be determined that there exists no smoke in the candidate area, and "the candidate area" of the current frame may be removed from "a candidate area list". And furthermore, when the average value of the current saturations is less than the second threshold value, it may be determined that there exists smoke in the candidate area, or in order to make the detection result more accurate, detection of other items on the candidate area may be continued.

In a further implementation (Implementation 3), whether there exists smoke in a candidate area may be determined, according to a result of comparison between current saturation information and background saturation information of the candidate area in a consecutive moving area.

Figure 8:
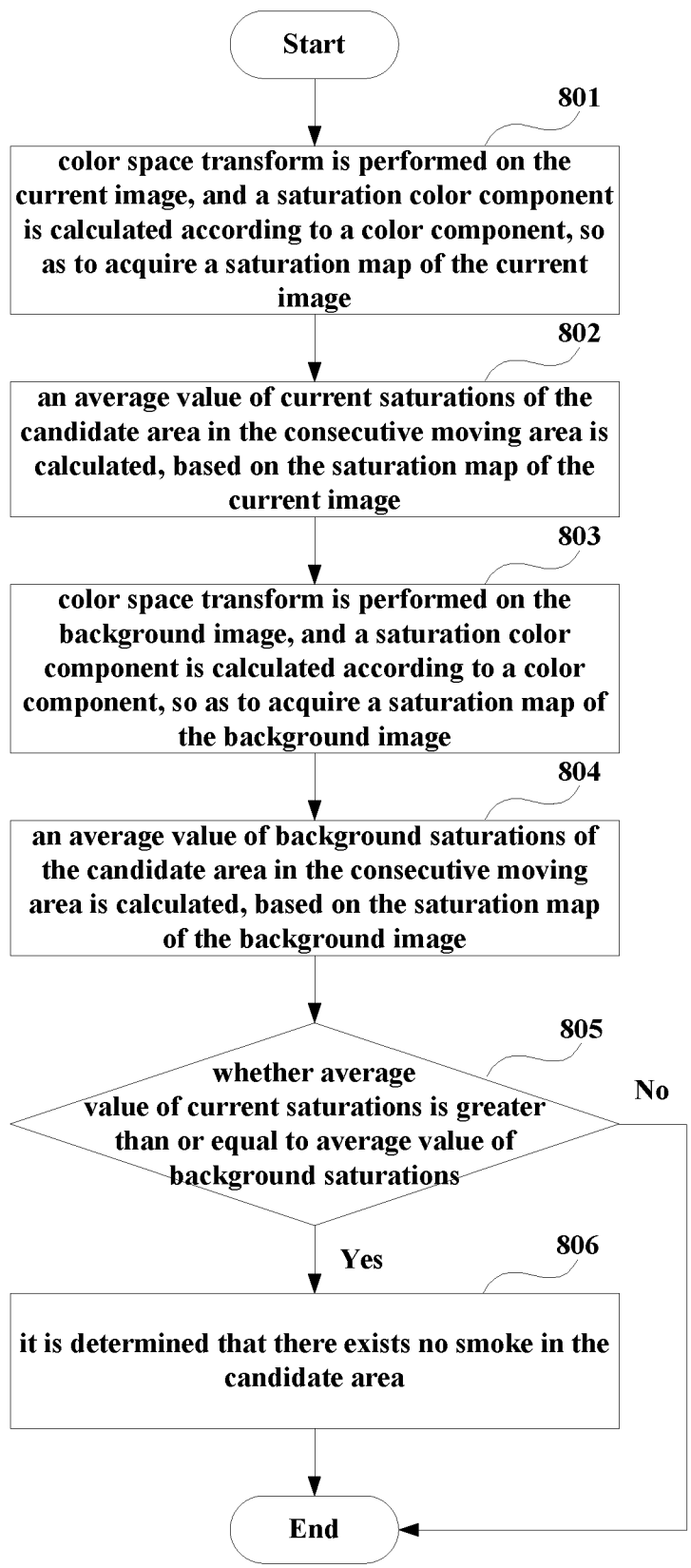
FIG. 8 is a further schematic diagram of performing smoke detection on a candidate area of Embodiment 1 of this disclosure.

FIG. 8 is a further schematic diagram of performing smoke detection on a candidate area of the embodiment of this disclosure. As shown in FIG. 8, the method includes:

Block 801: color space transform is performed on the current image, and a saturation color component is calculated according to a color component, so as to acquire a saturation map of the current image.

Block 802: an average value of current saturations of the candidate area in the consecutive moving area is calculated, based on the saturation map of the current image.

Block 803: color space transform is performed on the background image, and a saturation color component is calculated according to a color component, so as to acquire a saturation map of the background image.

Block 804: an average value of background saturations of the candidate area in the consecutive moving area is calculated, based on the saturation map of the background image; in this implementation, equation (3), for example, may also be used for calculating the average value of background saturations.

Block 805: it is determined whether the average value of the current saturations is greater than or equal to the average value of background saturations, and block 806 is executed when the average value of the current saturations is greater than or equal to the average value of background saturations; and Block 806: it is determined that there exists no smoke in the candidate area.

In this implementation, for example, if the average value of the current saturations is greater than or equal to the average value of background saturations, it shows that the overall saturation of the candidate area is relatively high, and an overall saturation of an area where there exists smoke is generally relatively low, therefore it may be determined that there exists no smoke in the candidate area, and "the candidate area" of the current frame may be removed from "a candidate area list". And furthermore, when the average value of the current saturations is less than the average value of background saturations, it may be determined that there exists smoke in the candidate area, or in order to make the detection result more accurate, detection of other items on the candidate area may be continued.

In still another implementation (Implementation 4), whether there exists smoke in a candidate area may be determined according to information of gray variance values of a candidate area in the consecutive moving area.

Figure 9:
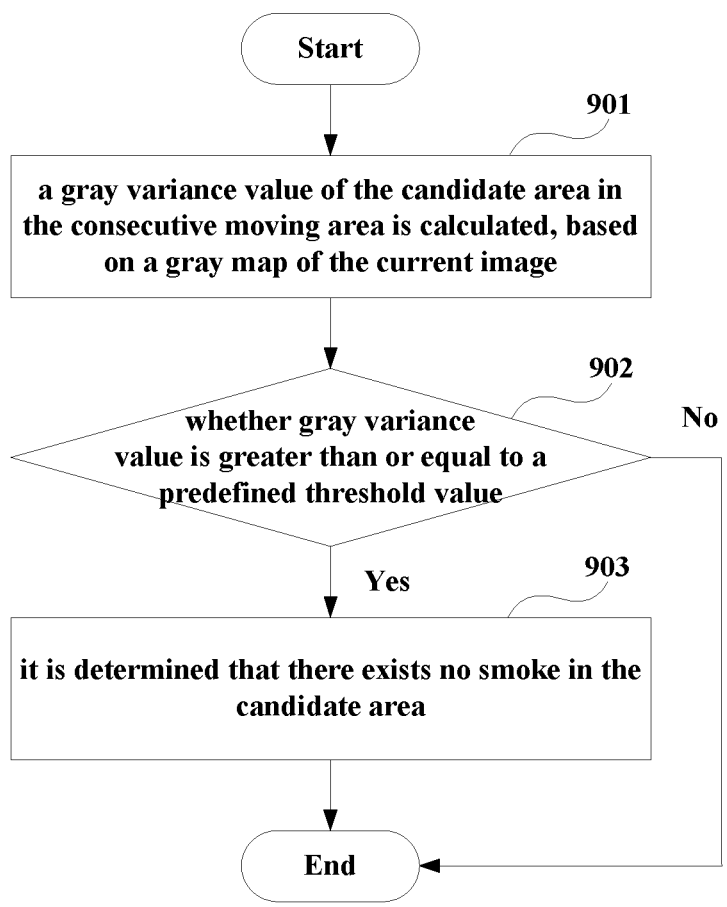
FIG. 9 is still another schematic diagram of performing smoke detection on a candidate area of Embodiment 1 of this disclosure.

FIG. 9 is still another schematic diagram of performing smoke detection on a candidate area of the embodiment of this disclosure. As shown in FIG. 9, the method includes:

Block 901: a gray variance value of the candidate area in the consecutive moving area is calculated, based on a gray map of the current image.

For example, an equation for calculating the gray variance value may be as shown by equation (4) below:

$$Y_{avg} = \frac{\sum_{i \in \Omega} Y_i}{N};$$

$$Var = \frac{1}{N} \sum_{i \in \Omega} (Y_i - Y_{avg})^2 \quad (4)$$

where, $\Omega$ is the consecutive moving area, N is the number of pixels of the consecutive moving area, i is a pixel of the consecutive moving area, $Y_i$ is a gray value of the pixel i, $Y_{avg}$ is a gray average value of the consecutive moving area, and Var is the gray variance value.

How to calculate the gray variance value is only illustrated above. However, this disclosure is not limited thereto, and appropriate adjustment or variation may be made according to an actual situation. Furthermore, any existing methods may be used for how to calculate a gray map or a gray value, which shall not be described herein any further.

Block 902: it is determined whether the gray variance value is greater than or equal to a predefined threshold value (a third threshold value), and block 903 is executed when the gray variance value is greater than or equal to the predefined threshold value;

in this embodiment, a particular numeral value of the third threshold value may be, for example, predefined according to an empirical value, and is not limited in this disclosure.

Block 903: it is determined that there exists no smoke in the candidate area.

In this implementation, for example, if the gray variance value is greater than or equal to the third threshold value, it shows that a texture of the object is relatively high, and a texture of smoke is generally relatively low, therefore it may be determined that there exists no smoke in the candidate area, and "the candidate area" of the current frame may be removed from "a candidate area list". And furthermore, when the gray variance value is less than the third threshold value, it may be determined that there exists smoke in the candidate area, or in order to make the detection result more accurate, detection of other items on the candidate area may be continued.

In yet another implementation (Implementation 5), whether there exists smoke in a candidate area may be determined according to gray average information of the candidate area in the consecutive moving area.

Figure 10:
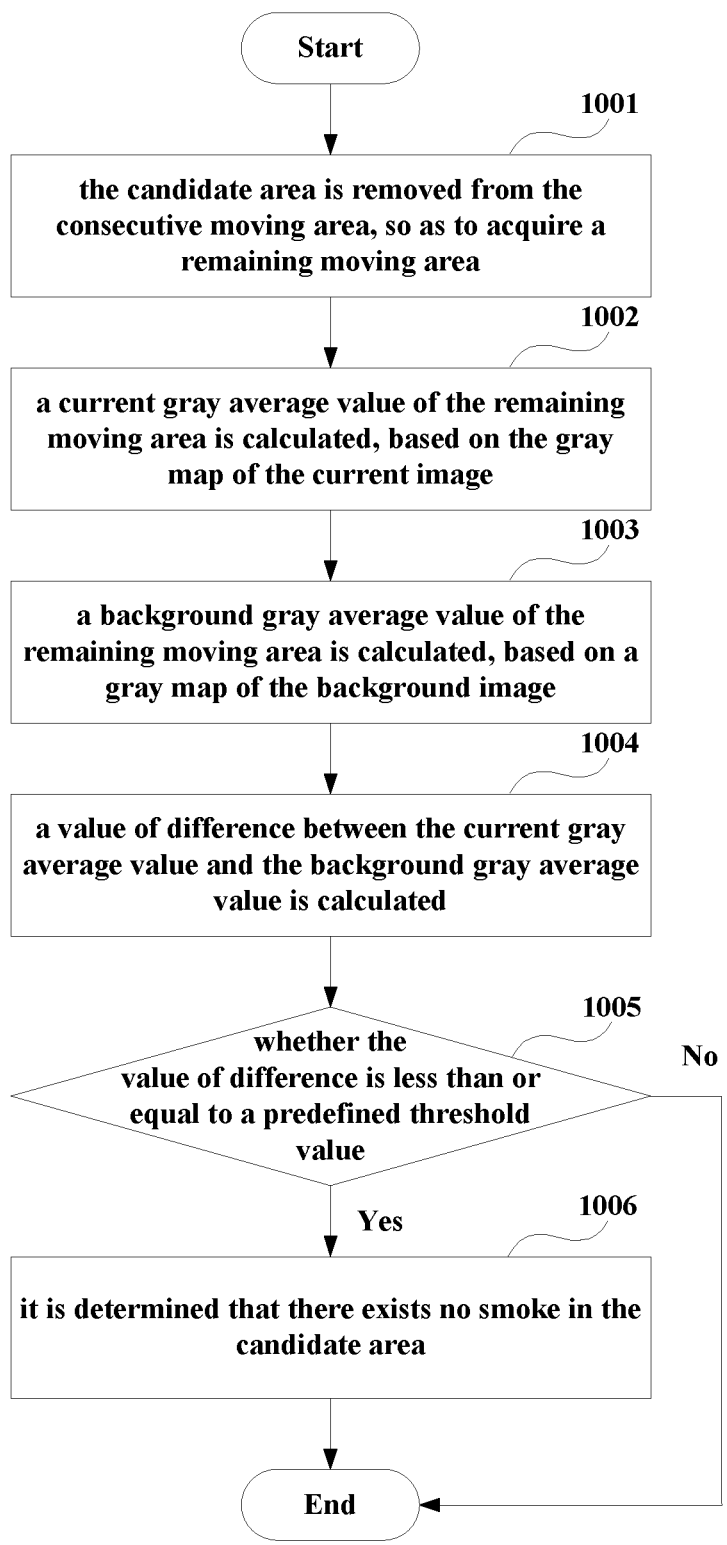
FIG. 10 is yet another schematic diagram of performing smoke detection on a candidate area of Embodiment 1 of this disclosure.

FIG. 10 is yet another schematic diagram of performing smoke detection on a candidate area of the embodiment of this disclosure. As shown in FIG. 10, the method includes:

Block 1001: the candidate area is removed from the consecutive moving area, so as to acquire a remaining moving area.

Figure 11:
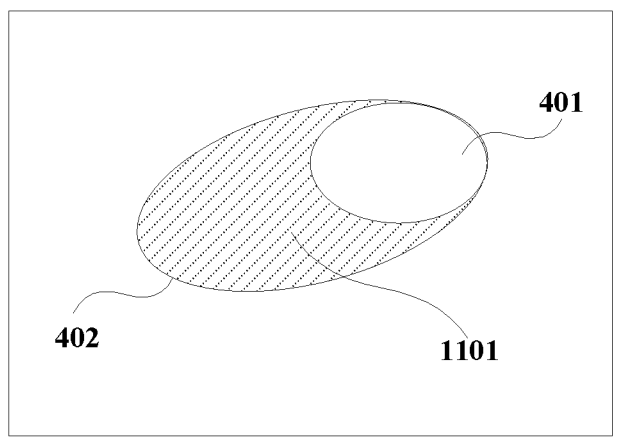
FIG. 11 is a schematic diagram of acquiring a remaining moving area of Embodiment 1 of this disclosure.

FIG. 11 is a schematic diagram of acquiring a remaining moving area of the embodiment of this disclosure, in which a remaining moving area is obtained based on FIG. 4. As shown in FIG. 11, the candidate area 401 of the current frame (the N-th frame) may be removed from the consecutive moving area 402 shown in FIG. 4, so as to obtain a remaining moving area 1101.

Block 1002: a current gray average value of the remaining moving area is calculated, based on the gray map of the current image.

For example, an equation for calculating the current gray average value may be as shown by equation (5) below:

$$F_{avg} = \frac{\sum_{i \in \Omega} Y_i}{N}; \quad (5)$$

where, $\Omega$ is the remaining moving area, N is the number of pixels of the remaining moving area, i is a pixel of the remaining moving area, $Y_i$ is a gray value of the pixel i in the current image, and $F_{avg}$ is the current gray average value of the remaining moving area.

Block 1003: a background gray average value of the remaining moving area is calculated, based on a gray map of the background image.

For example, an equation for calculating the background gray average value may be as shown by equation (6) below:

$$B_{avg} = \frac{\sum_{j \in \Omega} Y_j}{N}; \quad (6)$$

where, $\Omega$ is the remaining moving area, N is the number of pixels of the remaining moving area, j is a pixel of the remaining moving area, $Y_j$ is a gray value of the pixel j in the background image, and $B_{avg}$ is the background gray average value of the remaining moving area.

Block 1004: a value of difference between the current gray average value and the background gray average value is calculated.

Block 1005: it is determined whether the value of difference is less than or equal to a predefined threshold value (a fourth threshold value), and block 1006 is executed when the value of difference is less than or equal to the predefined threshold value; in this embodiment, a particular numeral value of the fourth threshold value may be, for example, predefined according to an empirical value, and is not limited in this disclosure.

Block 1006: it is determined that there exists no smoke in the candidate area.

In this implementation, for example, if the value of difference between the current gray average value and the background gray average value is less than or equal to the fourth threshold value, it shows that the moving object in the candidate area is a rigid object, and smoke is generally diffusely divergent, therefore it may be determined that there exists no smoke in the candidate area, and "the candidate area" of the current frame may be removed from "a candidate area list". And furthermore, when the value of difference is greater than the fourth threshold value, it may be determined that there exists smoke in the candidate area, or in order to make the detection result more accurate, detection of other items on the candidate area may be continued.

In yet another implementation (Implementation 6), whether there exists smoke in a candidate area may be determined according to gradient direction information of the candidate area.

Figure 12:
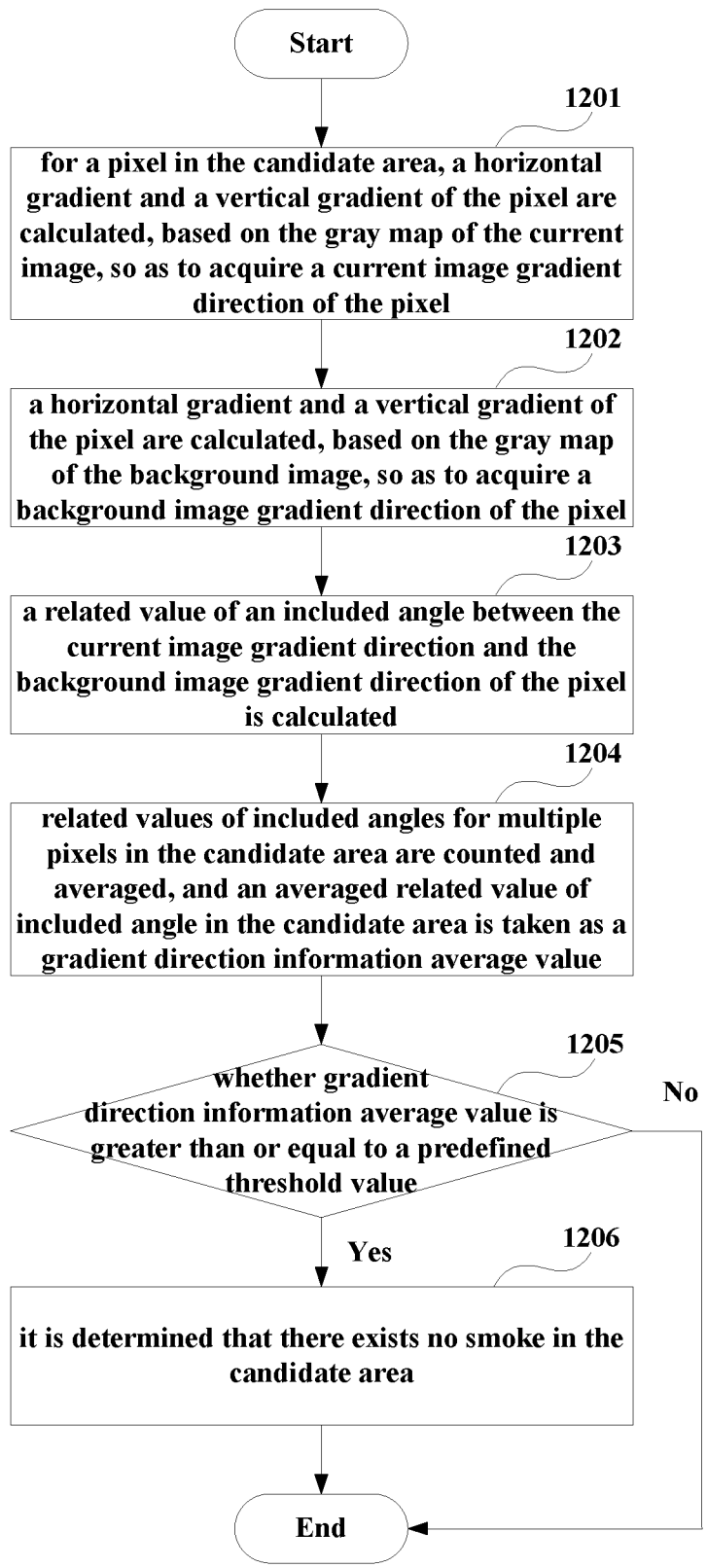
FIG. 12 is yet still another schematic diagram of performing smoke detection on a candidate area of Embodiment 1 of this disclosure.

FIG. 12 is yet still another schematic diagram of performing smoke detection on a candidate area of the embodiment of this disclosure. As shown in FIG. 12, the method includes:

Block 1201: for a pixel in the candidate area, a horizontal gradient and a vertical gradient of the pixel are calculated, based on the gray map of the current image, so as to acquire a current image gradient direction of the pixel.

Block 1202: a horizontal gradient and a vertical gradient of the pixel are calculated, based on the gray map of the background image, so as to acquire a background image gradient direction of the pixel.

In this implementation, for example, a horizontal gradient of a pixel may be calculated according to equation (7) below:

$$Gx = (-1)^* f(x-1, y-1) + 0^* f(x, y-1) + 1^*(x+1, y-1) + \\ (-2)^* f(x-1, y) + 0^* f(x, y) + 2^* f(x+1, y) + \\ (-1)^* f(x-1, y+1) + 0^* f(x, y+1) + 1^* f(x+1, y+1) = \\ [f(x+1, y-1) + 2^* f(x+1, y) + f(x+1, y+1)] - \\ [f(x-1, y-1) + 2^* f(x-1, y) + f(x-1, y+1)],$$ (7)

and a vertical gradient of the pixel may be calculated according to equation (8) below:

$$Gy = 1^* f(x-1, y-1) + 2^* f(x, y-1) + \\ 1^*(x+1, y-1) + 0^* f(x-1, y) \; 0^* f(x, y) + 0^* f(x+1, y) + \\ (-1)^* f(x-1, y+1) + (-2)^* f(x, y+1) + (-1)^* f(x+1, y+1) = \\ [f(x-1, y-1) + 2 f(x, y-1) + f(x+1, y-1)] - \\ [f(x-1, y+1) + 2^* f(x, y+1) + f(x+1, y+1)];$$ (8)

where, f is the pixel, x is the x coordinate of the pixel f, and y is the y coordinate of the pixel f.

Block 1203: a related value of an included angle between the current image gradient direction and the background image gradient direction of the pixel is calculated; in this implementation, the included angle may be acquired according to the current image gradient direction and the background image gradient direction, and then the related value (such as a cosine value) of the included angle is calculated. However, this disclosure is not limited thereto; for example, it may also be other related values (such as a cotangent value), and the following description shall be given by taking a cosine value as an example only.

Block 1204: related values of included angles for multiple pixels (such as all pixels) in the candidate area are counted and averaged, and an averaged related value of included angle in the candidate area is taken as a gradient direction information average value.

Block 1205: it is determined whether the gradient direction information average value is greater than or equal to a predefined threshold value (a fifth threshold value), and block 1206 is executed when the gradient direction information average value is greater than or equal to the predefined threshold value; in this implementation, a particular numeral value of the fifth threshold value may be, for example, predefined according to an empirical value, and is not limited in this disclosure.

Block 1206: it is determined that there exists no smoke in the candidate area.

In this implementation, for example, if the gradient direction information average value is greater than or equal to the fifth threshold value, it shows that the candidate area is not a foreground generated by a real moving object, while it is a pseudo-foreground caused by illumination changes. Hence. "the candidate area" of the current frame may be removed from "a candidate area list". And furthermore, when the gradient direction information average value is less than the fifth threshold value, it may be determined that there exists smoke in the candidate area, or in order to make the detection result more accurate, detection of other items on the candidate area may be continued.

How to determine whether there exists smoke in a candidate area is illustrated above. However, this disclosure is not limited thereto; for example, other attribute information may also be used for determination. And the above equations (1)-(8) only illustrate this disclosure. However, this disclosure is not limited thereto, and appropriate adjustment or variation may be made to the above equations (1)-(8) according to an actual situation.

Furthermore, one or more of the above implementations 1-6 may be adopted, such as adopting only one of the implementations, or all of the above implementations may be adopted, and an order for executing them is not limited. For example, implementations 1-6 may be in a sequential order, or implementation 4 may be executed first, and then implementation 2 is executed, and so on. In practical application, a particular detection scheme may be determined according to an actual situation.

It can be seen from the above embodiment that one or more candidate areas are acquired, based on the foreground image, attribute information of a candidate area corresponding to the current image and/or the background image is calculated, and whether there exists smoke in the candidate area is determined according to the attribute information.

Hence, not only the smoke can be detected quickly and accurately through video images, but also the detection accuracy of video-based smoke detection when light changes and at complex environments can be improved.

Embodiment 2

The embodiment of this disclosure provides an apparatus for smoke detection, corresponding to the method for smoke detection, with identical contents being not going to be described herein any further.

Figure 13:
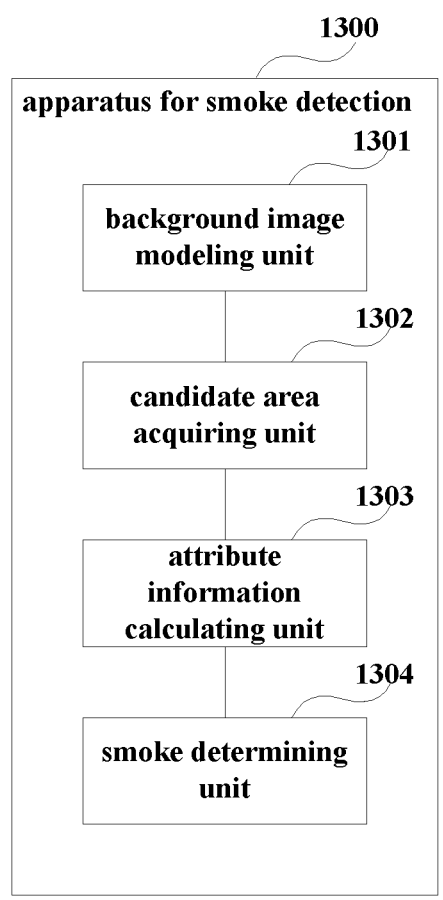
FIG. 13 is a schematic diagram of the apparatus for smoke detection of Embodiment 2 of this disclosure.

FIG. 13 is a schematic diagram of the apparatus for smoke detection of the embodiment of this disclosure. As shown in FIG. 13, the apparatus 1300 for smoke detection includes: a background image modeling unit 1301 configured to perform background image modeling on a current image, to acquire a foreground image and a background image of the current image; a candidate area acquiring unit 1302 configured to acquire, based on the foreground image, one or more candidate areas in the current image used for detecting a moving object; an attribute information calculating unit 1303 configured to calculate attribute information of a candidate area corresponding to the current image and/or the background image; and a smoke determining unit 1304 configured to determine whether there exists smoke in the candidate area according to the attribute information.

Figure 14:
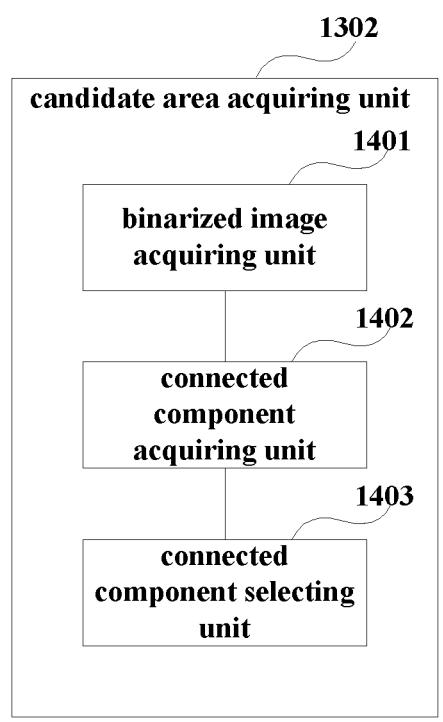
FIG. 14 is a schematic diagram of a candidate area acquiring unit of Embodiment 2 of this disclosure.

FIG. 14 is a schematic diagram of the candidate area acquiring unit of the embodiment of this disclosure. As shown in FIG. 14, the candidate area acquiring unit 1302 may include: a binarized image acquiring unit 1401 configured to acquire a binarized image of the foreground image; a connected component acquiring unit 1402 configured to take multiple pixels in the binarized image that have identical pixel values and are connected to each other as a connected component, to acquire one or more connected components representing a moving object in the foreground image; and a connected component selecting unit 1403 configured to select the connected components to acquire the one or more candidate areas.

The connected component selecting unit 1403 may be configured to remove a connected component of an area less than or equal to a predefined threshold value, and/or remove a connected component of an average color depth out of a predefined range. However, this disclosure is not limited thereto, and a connected component may be selected according to other rules.

Figure 15:
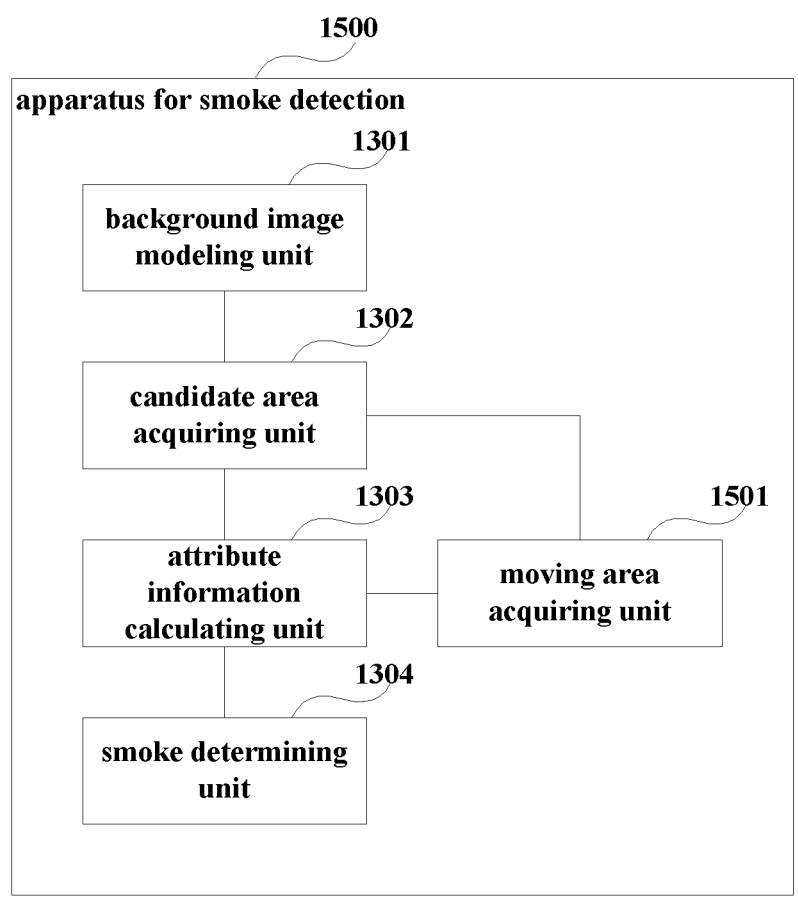
FIG. 15 is another schematic diagram of the apparatus for smoke detection of Embodiment 2 of this disclosure.

FIG. 15 is another schematic diagram of the apparatus for smoke detection of the embodiment of this disclosure. As shown in FIG. 15, the apparatus 1500 for smoke detection includes the background image modeling unit 1301, the candidate area acquiring unit 1302, the attribute information calculating unit 1303 and the smoke determining unit 1304, as described above.

As shown in FIG. 15, the apparatus 1500 for smoke detection may further include: a moving area acquiring unit 1501 configured to acquire a consecutive moving area to which the candidate area corresponds according to locations of the candidate area respectively in multiple image frames; and the attribute information calculating unit 1303 may further be configured to calculate the attribute information of the candidate area corresponding to the current image and/or the background image, based on the consecutive moving area.

In one implementation, whether there exists smoke in a candidate area may be determined according to whether a major moving direction of the candidate area in multiple image frames is downward.

In this implementation, the attribute information calculating unit 1303 may further be configured to acquire the major moving direction of the candidate area in multiple image frames, and the smoke determining unit 1304 may further be configured to determine that there exists no smoke in the candidate area in a case where the major moving direction of the candidate area is downward.

Figure 16:
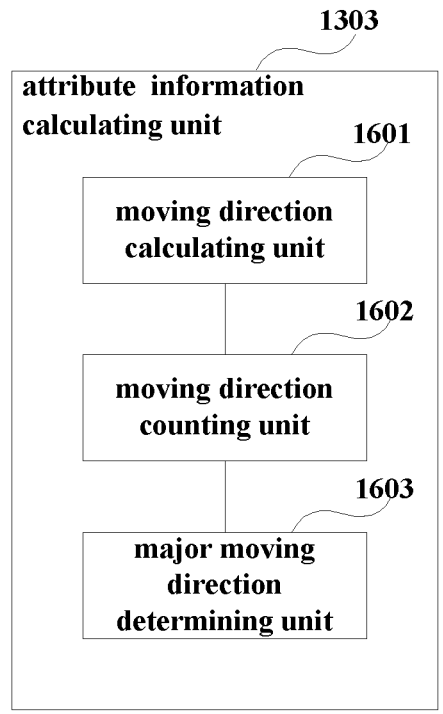
FIG. 16 is a schematic diagram of an attribute information calculating unit of Embodiment 2 of this disclosure.

FIG. 16 is a schematic diagram of the attribute information calculating unit of the embodiment of this disclosure. As shown in FIG. 16, the attribute information calculating unit 1303 may include: a moving direction calculating unit 1601 configured to calculate a moving direction of the candidate area relative to the current image in the multiple image frames, based on a mass center location and a gravity center location of the candidate area; a moving direction counting unit 1602 configured to count a frequency of appearance of each moving direction in the multiple image frames; and a major moving direction determining unit 1603 configured to determine a moving direction of a highest frequency of appearance as a major moving direction of the candidate area.

In another implementation, whether there exists smoke in a candidate area may be determined, according to whether saturation information of the candidate area in the consecutive moving area is less than a predefined threshold.

Figure 17:
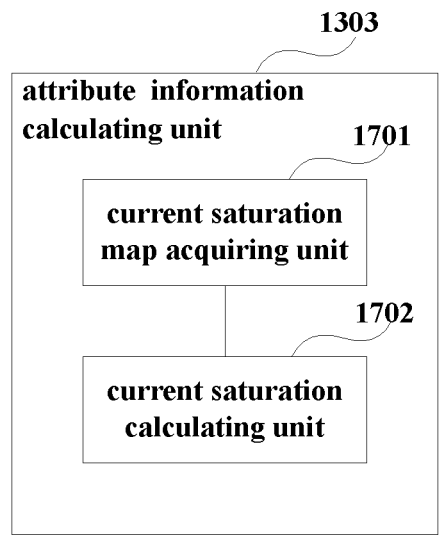
FIG. 17 is another schematic diagram of the attribute information calculating unit of Embodiment 2 of this disclosure.

FIG. 17 is another schematic diagram of the attribute information calculating unit of the embodiment of this disclosure. As shown in FIG. 17, the attribute information calculating unit 1303 may include: a current saturation map acquiring unit 1701 configured to perform color space transform on the current image, and calculate a saturation color component according to a color component, to acquire a saturation map of the current image; and a current saturation calculating unit 1702 configured to calculate an average value of current saturations of the candidate area in the consecutive moving area, based on the saturation map of the current image.

In this implementation, the smoke determining unit 1304 may further be configured to determine that there exists no smoke in the candidate area in a case where the average value of current saturations is greater than or equal to a predefine threshold value.

In another implementation, whether there exists smoke in a candidate area may be determined according to a result of comparison between current saturation information and background saturation information of the candidate area in a consecutive moving area.

Figure 18:
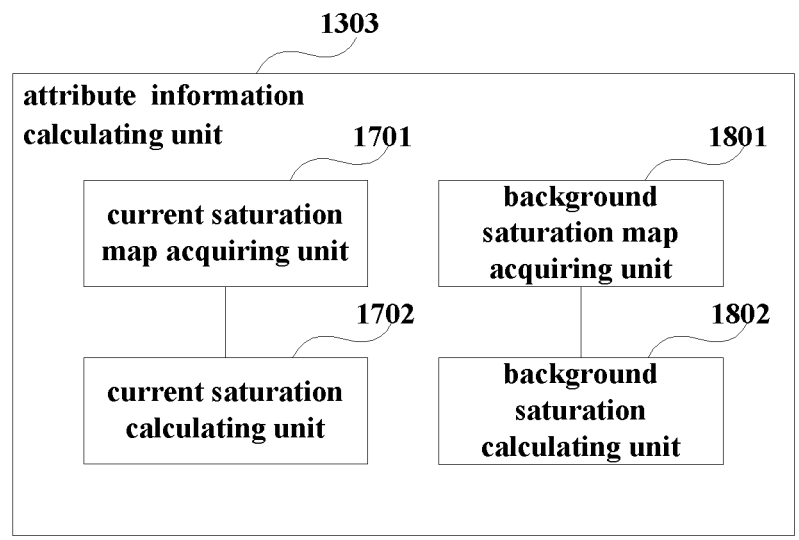
FIG. 18 is a further schematic diagram of the attribute information calculating unit of Embodiment 2 of this disclosure.

FIG. 18 is a further schematic diagram of the attribute information calculating unit of the embodiment of this disclosure. As shown in FIG. 18, the attribute information calculating unit 1303 may include a current saturation map acquiring unit 1701 and a current saturation calculating unit 1702, as described above.

As shown in FIG. 18, the attribute information calculating unit 1303 may further include: a background saturation map acquiring unit 1801 configured to perform color space transform on the background image, and calculate a saturation color component according to a color component, to acquire a saturation map of the background image; and a background saturation calculating unit 1802 configured to calculate an average value of background saturations of the candidate area in the consecutive moving area, based on the saturation map of the background image.

In this implementation, the smoke determining unit 1304 may further be configured to determine that there exists no smoke in the candidate area in a case where the average value of the current saturations is greater than or equal to the average value of background saturations.

In still another implementation, whether there exists smoke in a candidate area may be determined according to information on a gray variance value of a candidate area in the consecutive moving area.

Figure 19:
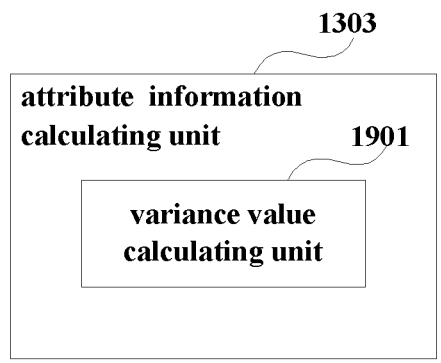
FIG. 19 is still another schematic diagram of the attribute information calculating unit of Embodiment 2 of this disclosure.

FIG. 19 is still another schematic diagram of the attribute information calculating unit of the embodiment of this disclosure. As shown in FIG. 19, the attribute information calculating unit 1303 may include: a variance value calculating unit 1901 configured to calculate a gray variance value of the candidate area in the consecutive moving area, based on a gray map of the current image.

In this implementation, the smoke determining unit 1304 may further be configured to determine that there exists no smoke in the candidate area in a case where the gray variance value is greater than or equal to a predefined threshold value.

In yet another implementation, whether there exists smoke in a candidate area may be determined according to gray average information of the candidate area in the consecutive moving area.

Figure 20:
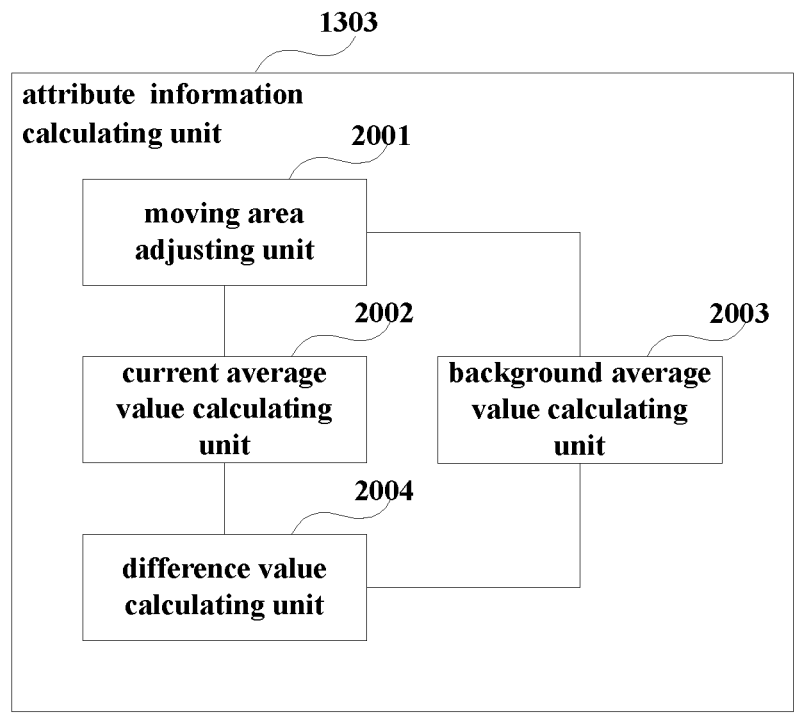
FIG. 20 is yet another schematic diagram of the attribute information calculating unit of Embodiment 2 of this disclosure.

FIG. 20 is yet another schematic diagram of the attribute information calculating unit of the embodiment of this disclosure. As shown in FIG. 20, the attribute information calculating unit 1303 may include: a moving area adjusting unit 2001 configured to remove the candidate area from the consecutive moving area, to acquire a remaining moving area; a current average value calculating unit 2002 configured to calculate a current gray average value of the remaining moving area, based on the gray map of the current image; a background average value calculating unit 2003 configured to calculate a background gray average value of the remaining moving area, based on a gray map of the background image; and a difference value calculating unit 2004 configured to calculate a value of difference between the current gray average value and the background gray average value.

In this implementation, the smoke determining unit 1304 may further be configured to determine that there exists no smoke in the candidate area in a case where the value of difference between the current gray average value and the background gray average value is less than or equal to a predefined threshold value. In yet another implementation, whether there exists smoke in a candidate area may be determined according to gradient direction information of the candidate area.

In this implementation, the attribute information calculating unit 1303 may further be configured to determine a gradient direction information average value of the candidate area, and the smoke determining unit 1304 may further be configured to determine that there exists no smoke in the candidate area in a case where the gradient direction information average value is greater than or equal to a predefined threshold value.

Figure 21:
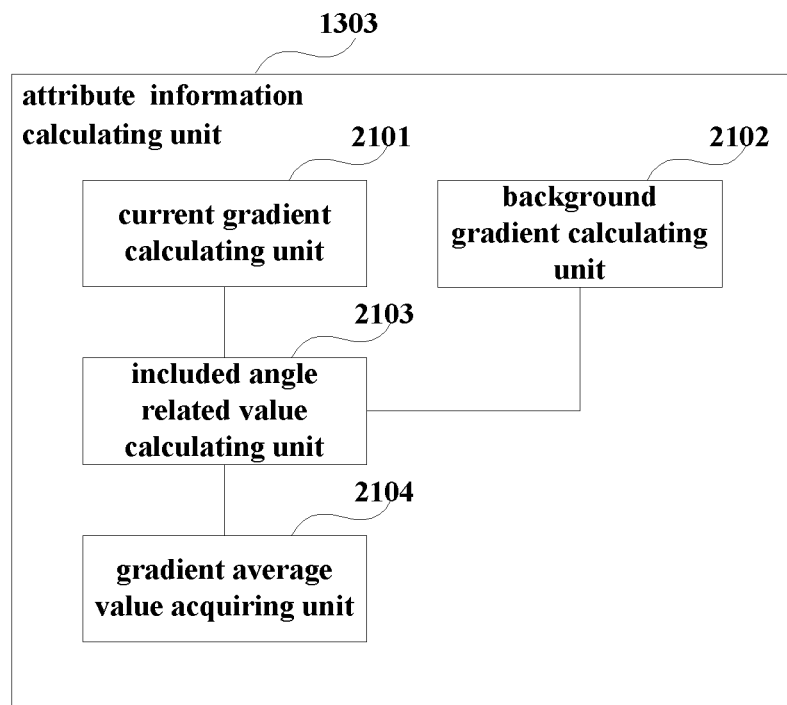
FIG. 21 is yet still another schematic diagram of the attribute information calculating unit of Embodiment 2 of this disclosure.

FIG. 21 is yet still another schematic diagram of the attribute information calculating unit of the embodiment of this disclosure. As shown in FIG. 21, the attribute information calculating unit 1303 may include:

a current gradient calculating unit 2101 configured to, for a pixel in the candidate area, calculate a horizontal gradient and a vertical gradient of the pixel, based on the gray map of the current image, to acquire a current image gradient direction of the pixel;

a background gradient calculating unit 2102 configured to calculate a horizontal gradient and a vertical gradient of the pixel, based on the gray map of the background image, to acquire a background image gradient direction of the pixel;

an included angle related value calculating unit 2103 configured to calculate a related value of an included angle between the current image gradient direction and the background image gradient direction of the pixel; and a gradient average value acquiring unit 2104 configured to count and average related values of included angles for multiple pixels in the candidate area, and take an averaged related value of included angle in the candidate area as a gradient direction information average value.

In this embodiment, the attribute information may include one or more of the following types of information: saturation information, gray variance information, gradient direction information, gray average information, and moving direction information. However, this disclosure is not limited thereto; for example, other attribute information may also be used for determination. And furthermore, one or more of the above implementations may be adopted, and a particular detection scheme may be determined according to an actual situation.

It can be seen from the above embodiment that one or more candidate areas are acquired, based on the foreground image, attribute information of a candidate area corresponding to the current image and/or the background image is calculated, and whether there exists smoke in the candidate area is determined according to the attribute information.

Hence, not only the smoke can be detected quickly and accurately through video images, but also the detection accuracy of video-based smoke detection when light changes and at complex environments can be improved.

Embodiment 3

The embodiment of this disclosure provides an image processing device, including the apparatus for smoke detection as described in Embodiment 2.

Figure 22:
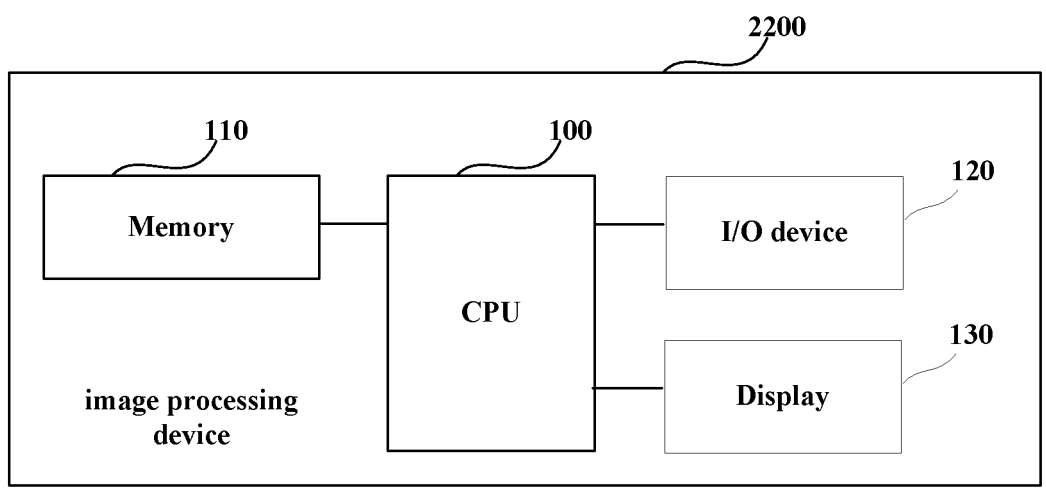
FIG. 22 is a schematic diagram of the image processing device of Embodiment 3 of this disclosure.

FIG. 22 is a schematic diagram of the image processing device of the embodiment of this disclosure. As shown in FIG. 22, the image processing device 2200 may include a central processing unit (CPU) 100 and a memory 110, the memory 110 being coupled to the central processing unit 100. The memory 110 may store various data, and furthermore, it may store programs for information processing, and the program may be executed under control of the central processing unit 100.

In an implementation, the functions of the apparatus for smoke detection may be integrated into the central processing unit 100. The central processing unit 100 may be configured to control the method for smoke detection as described in Embodiment 1.

In another implementation, the apparatus for smoke detection and the central processing unit 100 may be configured separately. For example, the apparatus for smoke detection may be configured as a chip connected to the central processing unit 100, with its functions being realized under control of the central processing unit 100.

In this embodiment, the central processing unit 100 may be configured to perform the following control:

performing background image modeling on a current image, so as to acquire a foreground image and a background image of the current image; acquiring, one or more candidate areas in the current image used for detecting a moving object, based on the foreground image; calculating attribute information of a candidate area corresponding to the current image and/or the background image; and determining whether there exists smoke in the candidate area according to the attribute information.

Furthermore, the central processing unit 100 may be configured to perform the following control: acquiring a consecutive moving area to which the candidate area corresponds, according to locations of the candidate area respectively in multiple image frames; and calculating the attribute information of the candidate area corresponding to the current image and/or the background image based on the consecutive moving area.

Furthermore, as shown in FIG. 22, the image processing device 2200 may include an input/output (I/O) device 120, and a display 130, etc. Functions of the above components are similar to those in the relevant art, and shall not be described herein any further. It should be noted that the image processing device 2200 does not necessarily include all the parts shown in FIG. 22, and furthermore, the image processing device 2200 may include parts not shown in FIG. 22, and the relevant art may be referred to.

An embodiment of the present disclosure provides a computer readable program code, which, when executed in an image processing device, will cause the computer to carry out the method for smoke detection as described in Embodiment 1 in the image processing device.

An embodiment of the present disclosure provides a computer readable medium, including a computer readable program code, which will cause the computer to carry out the method for smoke detection as described in Embodiment 1 in an image processing device.

The above apparatuses of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the principle of the present invention, and such variants and modifications fall within the scope of the present invention.

What is claimed is:

1. An apparatus for smoke detection in image frames of video, the apparatus comprising:
   at least one memory to store instructions and information; and
   at least one hardware processor coupled to the at least one memory to execute the instructions to, and/or the at least one hardware processor is to,
   perform background image modeling on a current image frame from the image frames, to acquire a foreground image and a background image of the current image frame;
   acquire at least one candidate area in the current image frame to detect a moving object, based on the foreground image;
   calculate attribute information of a selected candidate area among the at least one candidate area corresponding to the current image frame, and calculate attribute information of the background image,
   wherein the attribute information of the selected candidate area is calculated based on,
   acquiring a consecutive moving area among moving areas corresponding to the moving object to which the selected candidate area corresponds, according to locations of the moving areas respectively in at least two image frames among the image frames, and
   calculating the attribute information of the selected candidate area based upon a color space transformation on the current image frame, and a calculated saturation color component according to a color component, resulting in a saturation map of the current image frame, and
   calculating an average value of current saturations of the selected candidate area in the consecutive moving area, based on the saturation map of the current image; and
   wherein the attribute information of the background image is calculated based on,
   the consecutive moving area based on a color space transformation on the background image, and a calculated saturation color component according to a color component, resulting in a saturation map of the background image, and
   calculating an average value of background saturations of the selected candidate area in the consecutive moving area, based on the saturation map of the background image; and
   determine existence of smoke in the selected candidate area according to the attribute information based on determining non-existence of smoke in the selected candidate area in a case where the average value of the current saturations is greater than or equal to the average value of background saturations.

2. The apparatus according to claim 1, wherein to determine the existence of the smoke, the at least one hardware processor is to further determine that there exists no smoke in the selected candidate area in a case where the average value of the current saturations is greater than or equal to a threshold value.

3. The apparatus according to claim 1, wherein to calculate the attribute information of the selected candidate area, the at least one hardware processor is to further calculate a gray variance value of the selected candidate area in the consecutive moving area, based on a gray map of the current image frame.

4. The apparatus according to claim 3, wherein to determine the existence of the smoke, the at least one hardware processor is to further determine that there exists no smoke in the selected candidate area in a case where the gray variance value is greater than or equal to a threshold value.

5. The apparatus according to claim 1, wherein to calculate the attribute information of the selected candidate area, the at least one hardware processor is to further,
   remove the selected candidate area from the consecutive moving area, to acquire a remaining moving area;
   calculate a current gray average value of the remaining moving area, based on a gray map of the current image frame;
   calculate a background gray average value of the remaining moving area, based on a gray map of the background image; and
   calculate a value of difference between the current gray average value and the background gray average value.

6. The apparatus according to claim 5, wherein to determine the existence of the smoke, the at least one hardware processor is to further determine that there exists no smoke in the selected candidate area in a case where the value of difference is less than or equal to a threshold value.

7. The apparatus according to claim 1, wherein to calculate the attribute information of the selected candidate area, the at least one hardware processor is to further:
   for a pixel in the selected candidate area, calculate a horizontal gradient and a vertical gradient of the pixel, based on a gray map of the current image frame, to acquire a current image gradient direction of the pixel;
   calculate a horizontal gradient and a vertical gradient of the pixel, based on the gray map of the background image, to acquire a background image gradient direction of the pixel;
   calculate a related value of an included angle between the current image gradient direction and the background image gradient direction of the pixel; and
   count and average related values of included angles for multiple pixels in the candidate area, and take an averaged related value of included angle in the selected candidate area as a gradient direction information average value.

8. The apparatus according to claim 7, wherein to determine the existence of the smoke, the at least one hardware processor is to further determine that there exists no smoke in the selected candidate area in a case where the gradient direction information average value is greater than or equal to a threshold value.

9. The apparatus according to claim 1, wherein to acquire the at least one candidate area, the at least one hardware processor is to:
acquire a binarized image of the foreground image;
take multiple pixels in the binarized image that have identical pixel values and are connected to each other as a connected component, to acquire at least one connected component representing a moving object in the foreground image; and
select the at least one connected component, to acquire the at least one candidate area.

10. The apparatus according to claim 9, wherein to select the at least one connected component, the at least one hardware processor is to remove a connected component of an area less than or equal to a threshold value, and/or remove a connected component of an average color depth out of a range.

11. The apparatus according to claim 1, wherein to calculate the attribute information of the selected candidate area, the at least one hardware processor is to further:
calculate a moving direction of the selected candidate area relative to the current image frame in at least one image frame, among the image frames, based on a mass center location and a gravity center location of the selected candidate area;
a frequency of appearance of each moving direction in the at least one image frame; and
determine a moving direction of a highest frequency of appearance as a major moving direction of the selected candidate area.

12. The apparatus according to claim 11, wherein to determine the existence of the smoke, the at least one hardware processor is to further, determine that there exists no smoke in the selected candidate area in a case where the major moving direction of the selected candidate area is downward.

13. A method for smoke detection in image frames of video, the method comprising:
performing background image modeling on a current image frame from the image frames, to acquire a foreground image and a background image of the current image frame;
acquiring at least one candidate area in the current image frame to detect a moving object, based on the foreground image;
calculating attribute information of a selected candidate area among the at least one candidate area corresponding to the current image frame, and calculate attribute information of the background image,
wherein the attribute information of the selected candidate area is calculated by,
acquiring a consecutive moving area among moving areas corresponding to the moving object to which the selected candidate area corresponds, according to locations of the moving areas respectively in at least two image frames among the image frames, and
calculating the attribute information of the selected candidate area based upon a color space transformation on the current image frame, and a calculated saturation color component according to a color component, resulting in a saturation map of the current image frame, and
calculating an average value of current saturations of the selected candidate area in the consecutive moving area, based on the saturation map of the current image; and
wherein the attribute information of the background image is calculated by,
the consecutive moving area based on a color space transformation on the background image, and a calculated saturation color component according to a color component, resulting in a saturation map of the background image, and
calculating an average value of background saturations of the selected candidate area in the consecutive moving area, based on the saturation map of the background image; and
determining existence of smoke in the selected candidate area according to the attribute information based on determining non-existence of smoke in the selected candidate area in a case where the average value of the current saturations is greater than or equal to the average value of background saturations.

14. The method according to claim 13, wherein the attribute information comprises any one or combination of following types of information: saturation information, gray variance information, gradient direction information, gray average information, or moving direction information.

15. An image processing device, comprising the apparatus for smoke detection as claimed in claim 1.

* * * * *